Patented June 6, 1950

2,510,922

UNITED STATES PATENT OFFICE 2,510,922

MANUFACTURE OF NICOTINAMIDE

Joseph Berg and Victor L. King, Bound Brook, N. J., assignors to American Cyanamid Company, New York, N. Y., a corporation of Maine No Drawing. Application July 13, 1946, Serial No. 683,420

3 Claims. (Cl. 260—295.5)

This invention relates to an improvement in the manufacture of nicotinic acid derivatives and in particular to the preparation of esters and amides thereof. Even more specifically, the invention relates to a novel method of preparing high-grade alkyl nicotinates and nicotinamide from metal salts of nicotinic acid without initially isolating nicotinic acid, and to the products so prepared.

Nicotinic acid has become of increasing commercial importance because from it the human body can synthesize one of the constituents in the vitamin B complex. As a result, much work has been done on improving methods for its production. In addition to the increasing demand for nicotinic acid, its amide which has the same valuable property, has an equal if not greater importance, particularly as an additive in many foodstuffs. Accordingly, the practice of converting nicotinic acid to nicotinamide has also become subject to increasingly important consideration. It is with this problem that the present invention is primarily concerned.

In the past, this conversion has been generally performed in a series of stages. Nicotinic acid is first purified and then converted to an ester, usually methyl or ethyl nicotinate, and the latter is isolated, purified and converted to nicotinamide. While the reactions appear simple, from a theoretical standpoint, actually they do not proceed too well. There are also a number of practical drawbacks, particularly in attempting industrial development of the initial esterification.

First, nicotinic acid in a comparatively pure form must be made and used as the starting material. Otherwise the final yield is poor. Ordinarily, this purified nicotinic acid is then reacted with an alcohol, usually methyl alcohol. After a sufficiently long period of reflux, the alkyl nicotinate content of the esterification mixture is isolated, usually by distillation.

In addition, since esterification is never complete there is the practical necessity of recovering any unreacted nicotinic acid. But recovery of nicotinic acid, especially from dilute solution, is in itself a costly, wasteful and difficult operation by ordinary methods. All in all, the process is neither as chemically efficient nor as industrially attractive as is desired with regard to the time, equipment and labor required.

It is, therefore, an object of the present invention to provide a simple, reliable and economical method of preparing nicotinic acid esters, which method is not subject to the above-noted difficulties. It is, moreover, an important and further object of the invention to provide a method of converting the esters to nicotinamide, with or without an intermediate purification of the ester.

The first object of the invention, i. e., the preparation of nicotinic acid esters, is effectively carried out in a novel process. As a starting material this process utilizes a metal nicotinate, such as the zinc or copper salt, rather than the purified nicotinic acid of the prior art. By this procedure the necessity for preparing and purifying free nicotinic acid is completely eliminated. It is rather surprising that the metallic nicotinate may be as easily and simply utilized as a starting material as is found to be the case.

In general the ester is obtained by admixing the metallic salt with an aqueous solution containing the necessary amounts of alcohol and a strong mineral acid and refluxing the mixture until conversion of the metal salt to the ester has substantially stopped. The reacted mixture is then neutralized with an alkaline material such as ammonia, sodium carbonate or the like and the resulting solution clarified by filtration. Subsequent treatment depends on whether or not the ester is to be separated and purified before further treatment or is to be treated and the product thereof purified.

By starting with the metal salt a considerable advantage is obtained in being able to utilize the novel and efficient method for its production disclosed in the copending application of Victor L. King, Serial No. 656,535, filed March 22, 1946, now abandoned. In that application it is shown, among other things, that relatively pure metal salts of nicotinic acid are readily obtained from the relatively crude or unpurified mixtures obtained in synthesizing nicotinic acid. This is accomplished by the surprisingly selective precipitation of the nicotinate of a heavy metal, such for example as zinc which results from adding a soluble salt of the metal to an aqueous solution of an unpurified mixture containing nicotinic acid.

Starting the present operation with the salt also enables utilization of the efficient method of recovering even small traces of nicotinic acid from dilute solutions, especially dilute mother liquors, disclosed in the application of King, Dean and Laury, Serial No. 437,016, filed March 31, 1942, now Patent No. 2,447,234, August 17, 1948. As pointed out in those applications not only may substantially all nicotinic acid in any solution thereof be quickly and readily precipitated as a metal salt thereof, preferably the zinc salt, but as shown in the former, the metal salt is obtained in a surprisingly pure state.

The initial step of the present invention, the preparation of alkyl nicotinates, directly from a zinc nicotinate presents a number of advantages. It eliminates the wasteful and expensive necessity for isolating and purifying the original nicotinic acid, as noted above, this being one of the principal drawbacks of the prior art. Second, any unesterified nicotinic acid may be readily recovered as the insoluble metal nicotinate and recycled. Third, because the metal nicotinate is used it enables an economical utilization of various mother liquors obtained originally during the process of making the unpurified nicotinic acid.

From the foregoing discussion, the esterification is seen to be accomplished in a relatively simple manner. There are, however, certain practical considerations. While not essential, it has been found that the reaction proceeds smoothly in concentrated sulfuric acid, i. e., about a 96% grade. The amount of acid used may be somewhat varied. On a weight basis, it is usually found desirable to use between about one and one-half times the weight of nicotinic acid salt. If so desired, more or less may of course be used. Larger amounts have no appreciably beneficial effect and appreciably smaller amounts may result in decreased yields. It is usually found simplest to suspend the nicotinic acid salt in the acid and add the alcohol thereto.

Any of the alkanols, methanol, ethanol, butanol and the like may be used. The amount required, on a weight basis, will vary somewhat with the particular alcohol chosen. Some excess is beneficial. With methanol, which is highly satisfactory and will herein be taken as illustrative, about two to two and one-half times the weight of nicotinic acid salt used is a good average practice although somewhat more or less may be used. Excessively larger amounts, however, have no real practical advantage and may increase the problem of isolating the ester if such an operation is carried out.

If the purified ester itself is desired, it may be obtained from the neutralized esterification mixture in any of several ways. For example, it may be extracted with a volatile organic solvent such as benzene. The benzene is readily driven off, being recovered if so desired, and, if so desired, the ester further purified as by distillation. As another alternative, the alkyl nicotinate may be recovered by a process in which any excess alcohol is distilled off and the ester recovered by salting out with ammonium sulfate or the like.

Probably the most desirable procedure is to employ a combination of both salting out and solvent extraction. For example, the reacted mixture, preferably after removing the excess alcohol, is neutralized and clarified by filtration. If this mixture is saturated with a suitable salt such as ammonium sulfate and allowed to separate two layers are obtained. The lower layer will contain some ester, possibly some 3%, substantially all the metal, as the metal sulfate, and any unconverted nicotinic acid. This layer is extracted with fresh benzene and the benzene extract used to extract the upper layer which contains substantially all the ester. The benzene extract may be then separated out, the benzene distilled off and the ester purified by distillation at reduced pressures. The ester is in pure form a solid at ordinary temperatures but is so low melting that it is more easily purified by distillation than by any attempt at crystallization. In distilling, a fairly high vacuum should be maintained to minimize any tendency of the ester toward decomposition. The ester is either a water white liquid or a white crystalline solid having a setting point at about 40° C., and a boiling point of about 111.5°–112° C. at 25–30 mm.

By virtue of the fact, as noted above, that the zinc or other metal salt of nicotinic acid is used as the starting material, the various components of the zinc sulfate layer may be easily recovered and reused. The raffinates from the several extractions may be combined and any unextracted ester saponified with caustic soda. On acidification, any nicotinic acid will then precipitate as the zinc salt. This latter may be separated out by filtration for reuse and the zinc sulfate liquor may be reused to precipitate zinc nicotinate from additional amounts of crude nicotinic mixtures and mother liquors obtained in the synthesis of the nicotinic acid.

Preparation of methyl nicotinate as illustrative of the alkyl nicotinates formed in the first step of the present process is shown in the following examples which are intended as illustrative only. All parts are by weight unless otherwise noted.

Example 1

38 parts of zinc nicotinate is suspended in 60 parts of 96% sulfuric acid and 80 parts of methanol added thereto. This mixture is refluxed for about 4½ hours and neutralized with sodium carbonate. The ester is extracted with benzene and the benzene content of the extract removed by distillation. 21 parts of methyl nicotinate were obtained.

Example 2

76 parts of zinc nicotinate is suspended in 75 parts of 96% sulfuric acid and 200 parts of methanol added thereto. The mixture was refluxed at 73–78° C. for about 11 hours after which the methanol was distilled off and the residue neutralized with ammonium hydroxide. 60 parts of methyl nicotinate are recovered by salting out with ammonium sulfate.

Example 3

300 parts of zinc nicotinate is mixed with 315 parts of 98% $H_2SO_4$ and 750 parts of methanol. Heat is applied and the mixture refluxed for about 10 hours after which the excess methanol is distilled off and the acid residue neutralized to a pH of about 8.5 with aqua ammonia, and the solution clarified by filtration. Clarified solution is saturated with ammonium sulfate and allowed to separate into two layers, a "zinc sulfate" layer and a "crude ester" layer. The zinc sulfate layer is extracted with 600 parts of benzene in three portions and the benzene extract then used to extract the crude ester layer. The benzene extracts are combined and charged to a still in which the benzene is stripped off at atmospheric pressure to a temperature of about 105° C. The last traces of benzene are removed under vacuum at about 100 mm. pressure and 120° C. still temperature. Finally the ester is distilled over at 25 mm. pressure at a temperature of about 111.8° C. About 185 parts of pure ester is obtained.

As noted above, it is a further principal object of the present invention to provide a simple, easy and economical method of preparing nicotinamide. According to the present invention this may be done in either of two ways. The alkyl nicotinate obtained in the first operation, because of the purity in which the starting material, the zinc or copper salt, is precipitated during the original nicotinic acid synthesis, is itself of sufficient purity so that if so desired it may be directly amidated without purification.

There are certain advantages in this procedure. Amidation may be carried out directly using strong aqueous ammonia if so desired. Preferably, however, an added amount of anhydrous ammonia is used in order to increase the yields and speed of reaction. To prevent ammonia losses and maintain the concentration, it is desirable that the temperature be retained as low as possible. From about 0–5° C. has been found to be a good practical range.

The procedure is relatively simple. Aqueous and anhydrous ammonia are combined and the ester added thereto. Preferably this is done to the point of saturation. The ester will usually crystallize out but on standing in an ice bath is gradually redissolved. After further standing for a sufficient period to carry out the amidation, the mixture on agitation develops into a thick slurry from which a good grade of nicotinamide may be recovered by simple filtration. Yields in amounts up to 50–60% based on the original metal nicotinate are ordinarily obtained.

An increased yield of some 10% may be obtained by evaporating the residual liquor to about 110° C. and resaturating the residue with ammonia. This additional nicotinamide is of somewhat poorer grade but may be purified readily by recrystallization.

Even after this further treatment the residual liquors still contain potential nicotinamide. This may be recovered to a large extent by acidifying the mother liquor, with sulfuric acid or the like, to a fairly low pH of about 1.5 to 2.0 and heating at about 80–100° C. If the pH is then increased to about 5–6 and a soluble metal salt, such as zinc chloride, for example, is added thereto, the unreacted and unrecovered nicotinic acid equivalents are precipitated as the salt which is easily filtered out for reuse.

The crude nicotinamide recovered from the ammonia slurry usually has a melting point of from about 126–129° C. This product is readily brought up to U.S.P. grade by recrystallization, for example by dissolving the product in alcohol at the boiling point, clarifying the solution with decolorizing carbon, filtrating the solution and recrystallizing the amide by cooling to about 0° C.

Illustrative of the direct conversion of a metal nicotinate to nicotinamide is the following example, which is intended as illustrative only and not by way of limitation. Again all parts are by weight unless otherwise noted.

*Example 4*

76 parts of zinc nicotinate is suspended in an approximately equal weight of 96% sulfuric acid and 140 parts of methanol added thereto. This mixture is heated to reflux at 70–80° C. for about 10 hours after which the methanol is distilled off, recovering about 100 parts. The residual mixture is cooled, neutralized with ammonia, while maintaining the temperature below about 30° C. and finally saturated with ammonia sulfate. The ester is salted out into an upper layer and separated. The crude ester is added to 50 parts of aqueous ammonia and 18 parts of anhydrous ammonia to saturation at 5° C. The ester, which crystallizes out on standing at 5° C. is gradually redissolved. After about 12 hours standing at 5°–10° C. the mixture is stirred, filtered and dried, resulting in about 30 parts of a cream-colored nicotinamide melting at 126°–129° C. A second fraction is recovered by evaporating the mother liquor to 110° C., cooling, resaturating with NH$_3$ and filtering off the resultant nicotinamide in amount of about 10 parts. The crude nicotinamide is recrystallized to U.S.P. grade by dissolving at the boiling point in 2B alcohol, clarifying with decolorizing carbon and cooling to 0° C.

On the other hand, it is quite simple and effective to further purify the ester by distillation. When this is done the amount of purification which must be carried out on amide is greatly reduced. In fact, the amide which forms as the solid constituent of a slurry during amidation, may be recovered directly from the slurry by centrifugal separation, washing with ammonia and drying. In general, yields of the amide are somewhat better by this procedure than when the ester is directly amidated and the major purification carried out on the amide. Therefore, while not essential, it is probably preferably that the ester be purified before amidation. This procedure is illustrated in the following example.

*Example 5*

About 185 parts of distilled ester, obtained as in Example 3, is admixed with about $\frac{1}{10}$ its volume of water and mixed at about 5° C. with about 130 parts concentrated aqueous ammonia. About 52 parts of anhydrous ammonia is added thereto and the mixture held at about 0–10° C. until amidation substantially ceases, usually about 24 hours. The resultant nicotinamide slurry is centrifuged and the cake washed with about 50 parts of cold aqueous ammonia. The product, about 100 parts, is found to be of U. S. P. grade without further treatment.

We claim:

1. In preparing nicotinamide, the improved process which comprises suspending a zinc salt of nicotinic acid in a concentrated aqueous solution of a strong mineral acid, adding thereto, in excess, an alkanol of 1 to 6 carbon atoms, refluxing the mixture until a major portion of the salt is converted to an alkyl nicotinate, removing the unreacted alkanol, increasing the pH of the acid residue to about 8.0–8.6 with aqueous ammonia, filtering the alkaline solution, separating the alkyl nicotinate from the filtrate and amidating the separated nicotinate with aqueous ammonia and anhydrous ammonia.

2. In preparing nicotinamide, the improved process which comprises the steps of suspending a zinc salt of nicotinic acid in a concentrated aqueous solution of a strong mineral acid, adding thereto, in excess, an alkanol of about 1 to 6 carbon atoms, refluxing the mixture until a major portion of the salt is converted to an alkyl nicotinate, removing the unreacted alkanol, raising the pH of the acidic residue to alkalinity, separating the alkyl nicotinate from the alkaline mixture, combining the separated nicotinate with aqueous ammonia and with anhydrous ammonia at low temperature, allowing the mixture to stand at about 0°–10° C., until reaction is substantially complete, and separating the amide from the reaction mixture.

3. In preparing nicotinamide, the improved process which comprises suspending zinc nicotinate in a concentrated aqueous solution of a strong mineral acid, adding thereto, in excess, an alkanol of 1 to 6 carbon atoms, refluxing the mixture until a major portion of the salt is converted to alkyl nicotinate, removing the unreacted alkanol, increasing the pH of the acid residue to about 8.0–8.6 with aqueous ammonia, filtering the alkaline solution, extracting the filtrate with a water-immiscible solvent for the alkyl nicotinate, separating the nicotinate from the extract, combining the separated nicotinate with aqueous ammonia and with anhydrous ammonia at low temperature, allowing the mixture to stand at about 0°–10° C., until reaction is substantially complete, and separating the amide from the reaction mixture.

JOSEPH BERG.
VICTOR L. KING.

REFERENCES CITED

The following references are of record in the file of this patent:

UNITED STATES PATENTS

| Number | Name | Date |
|---|---|---|
| 2,267,734 | Henke | Dec. 30, 1941 |
| 2,280,040 | Seibert | Apr. 14, 1942 |
| 2,413,615 | Fox | Dec. 31, 1946 |

OTHER REFERENCES

Fuson: Identification of Organic Compound, 2d edition, page 254.